United States Patent Office 3,482,017
Patented Dec. 2, 1969

3,482,017
COMPOSITION AND METHODS FOR TREATING FOWL HAVING LEUKOSIS
Carlton S. Nash, Amherst St.,
South Hadley, Mass. 01075
No Drawing. Continuation of application Ser. No. 616,502, Feb. 16, 1967, which is a continuation of application Ser. No. 487,593, Sept. 15, 1965. This application Jan. 21, 1969, Ser. No. 792,763
Int. Cl. A61k 15/00, 27/00; A23k 1/16
U.S. Cl. 424—180                                   10 Claims

ABSTRACT OF THE DISCLOSURE

A composition useful in the treatment of leukosis in afflicted fowl which includes between about 3 to 6 parts by weight of a nutrient feed and 1 part by weight of a mixture of lactose and dextrin. In older chickens, treatment of leukosis includes administering at least 50 mg. per day of vitamin $B_1$.

DESCRIPTION OF INVENTION

This application is a continuation application of my copending application Ser. No. 616,502 filed Feb. 16, 1967, now abandoned, which in turn is a continuation application of my previously copending application Ser. No. 487,593 filed Sept. 15, 1965, now abandoned, which in turn is a continuation-in-part of my previously copending application Ser. No. 370,678 filed May 27, 1964, now abandoned.

This invention relates to the treatment of fowl afflicted with avian leukosis complex and arthritis.

Avian leukosis complex in fowl may take a variety of forms. Sometimes referred to as "fowl paralysis," avian lukosis complex is used to designate a variety of crippling conditions. Symptoms depend on the part of the body affected. Avian leukosis complex is generally classified according to the body parts affected, and may be divided into six general types as follows: (1) neural lymphomatosis (nervous system), (2) oculra lymphomatosis (eyes), (3) visceral lymphomatosis (internal organs), (4) osteopetrosis (bones), (5) leukosis (blood), and (6) tumors of the skin. The disease may strike fowl of any age, but the onset of symptoms is generally most pronounced in birds that have not yet reached the egg laying stage or which have been in the egg laying stage for only a few weeks. In chickens the onset of symptoms is generally most pronounced when the chicken is about 8 to 26 weeks old. The leukosis complex, and particularly neural lymphomatosis and visceral lymphomatosis, produces crippling symptoms such as drooping of wings and lameness in which the fowl is on its hocks or even completely unable to stand. In chickens which have reached the egg laying stage, which usually begins at about 20 weeks, symptoms of leukosis are often observed simultaneously with symptoms of arthritis. Hens afflicted with leukosis generally lay few, if any, eggs. Avian leukosis generally terminates in death.

It is an object of this invention to prolong the life and cause remission or arresting of symptoms of avian leukosis in fowl, promote gain in weight and restore the fowl to productive egg laying, through control of diet with appropriate dietary supplements.

A further object of this invention is to provide methods for orally administering a therapeutic agent effective in the treatment of leukosis in chickens afflicted with the disease so as to prolong their life and enhance their egg laying capacity.

A further object is to increase egg production in chickens.

A further object is to provide novel and therapeutically active compositions which are useful in the treatment of leukosis.

A further object is to prevent leukosis by dietary control before the condition becomes evident.

A further object is to cause chickens to molt at a later age than normally and thereby increase egg production.

According to this invention, I have found that avian leukosis in chickens may be treated by the administration to the chickens of at least one member of the group consisting of lactose, compositions of lactose and dextrin, and vitamin $B_1$.

The preferred medication depends very largely on the age of the chicken. In chickens which have not yet reached the stage of laying eggs (which is approximately 20 weeks), it has been found that the most effective treatment is to administer about 8.6 to 32.5 grams per day of a composition comprising lactose and dextrin. The lactose-dextrin composition may be purchased under the name "Lacto-Dextrin," which is manufactured by the Battle Creek Food Company, Battle Creek, Mich. This composition contains approximately 73% by weight of lactose and 25% by weight of dextrin, the balance consisting of tricalcium phosphate and small amounts of flavoring. Other compositions containing lactose and dextrin in different proportions, with or without additional ingredients, may be used instead of the specific composition contained in "Lacto-Dextrin." "The different proportions of lactose to dextrin are based upon the lactose requirement of 10 to about 60 grams per day as hereinafter discussed. The calculated weight ratio in the lactose-dextrin mixture is in the range of between substantially all lactose to about 2.25 parts of dextrin to one part of lactose."

The lactose-dextrin mixture is most conveniently administered as a novel composition consisting of 3 to 6 parts by weight of an ordinary nutrient chicken feed or mash and 1 part by weight of said lactose-dextrin mixture. These compositions of feed and lactose-dextrin mixture are palatable compositions which supply both the nutritional and therapeutic requirements of the chicken. If the ratio of feed to lactose-dextrin mixture is less than 3:1 palatability suffers and the chicken will not eat enough to supply its nutritional requirements. To supply a therapeutically effective amount of the lactose-dextrin mixture, the ratio of feed to said lactose-dextrin mixture should not exceed about 6:1. Since a chicken will ordinarily consume approximately 60 to 130 grams per day of a nutrient feed, depending on the weight of the chicken and the rate of egg production, it will be seen that the compositions as specified herein supply the lactose-dextrin mixture in the desired range of about 8.6 to 32.5 grams per day.

Mature chickens, i.e. those of about 20 weeks in age and older, and consequently of egg laying age in the case of hens, are more advantageously treated with either powdered lactose, massive doses of vitamin $B_1$ (thiamine hydrochloride), or a combination of the two, given either concurrently or alternately. Lactose may be given in amounts ranging from about 10 to about 60 grams per day. Lactose is conveniently given in the form of a novel composition of nutrient feed or mash and lactose containing from about 15% to 50% by weight of lactose, the balance mash. A preferred composition is one containing about 50% by weight of lactose and about 50% by weight of nutrient feed. Alternatively the lactose may be slurried or dissolved in water. Preferably 1 part by weight of lactose is slurried in at least 1 part by weight of water, and it is better to form more dilute slurries, containing from 1 part by weight of lactose to 3 parts by weight of water down to as little as 1 tablespoonful of lactose per gallon of water. A preferred slurry contains 24 tablespoonfuls of lactose per gallon of water. Lactose can also be given in tablet form, or as a dry powder unmixed with other ingredients.

Vitamin $B_1$ is given in massive doses. The minimum effective daily dosage is about 50 mg. Dosages of at least 100 mg. per day result in more rapid improvement in the chicken's condition and are therefore preferred. Vitamin $B_1$ can be given in amounts as high as 5000 mg. per day without causing harm. Vitamin $B_1$ is conveniently given in the form of commercial vitamin $B_1$ tablets. Of course, one may administer vitamin $B_1$ in powdered form either by itself or administered with a nutrient feed or mash or the vitamin $B_1$ may be dissolved in water and administered as a solution. Chickens receiving vitamin $B_1$ continue to receive the usual daily requirements of feed.

Administration of lactose or vitamin $B_1$ medication is continued so long as symptoms of leukosis are present. The medication may be withdrawn if desired when the chicken appears to be restored to health as indicated by gain in weight, by regular good laying in the case of hens, and the appearance of a comb of good color and the lack of crippling conditions such as lameness of legs and drooping of wings.

Recovery is speeded if the chickens are maintained in a controlled atmosphere during treatment. Temperatures below about 70° F., and relative humidities in excess of 50% are preferably avoided as such conditions appear to retard recovery. Recovery appears to be most rapid when the temperature is in the range of about 75° to 80° F. and the relative humidity is less than 50%. The condition of chickens is best at higher barometric pressures, i.e., above about 30.00 inches of mercury.

The quality of the feed or mash given to the chickens also appears to influence the rate of recovery. The onset of symptoms of leukosis is noted most frequently when the chickens are given commercial feeds containing cracked corn, i.e., whole kernel corn broken up into coarse particles. Conversely when such feeds are sifted to remove the cracked corn before they are given to the chickens, recovery of the chickens appears to be more rapid.

Chickens treated as described above are observed to improve in condition, the symptoms of leukosis such as lameness of legs and drooping of wings in many cases completely or largely disappearing. Cure or remission appears to occur in approximately 80% of the chickens treated. In the case of hens, it is generally possible to restore the hens to regular daily egg laying, even in those cases where not all crippling symptoms entirely disappear. This, of course, represents a tremendous economic advantage. The life span of chickens treated according to this invention is lengthened considerably, and generally when death does occur it is not attributable to leukosis.

I have also found that the administration of at least one member of the group consisting of lactose and vitamin $B_1$ causes chickens to molt at a later age than normal and thereby increases egg production. The amounts of lactose and vitamin $B_1$ given for this purpose are the same as the amounts already indicated, i.e., about 10 to 60 grams per day of lactose, and at least 10 mg. per day of vitamin $B_1$. Either lactose, vitamin $B_1$, or both, may be given in order to postpone the time of molting.

Normally a hen molts at the age of about 12–13 months. Egg production is very low during molting, which may take about a month, and after molting egg production is never again as high as it was prior to molting. Hens which are given either lactose or vitamin $B_1$, or both, as aforementioned, molt at a later age, about 17–18 months. Egg production continues at a high level, normally characteristic of hens only during their first year of life, until molting takes place.

Administration of lactose, vitamin $B_1$, or both in order to postpone the time of molting, may be carried out both in healthy hens and in those which have leukosis. In the latter case, the medication causes remission of leukosis, as already indicated, and also delays the time of molting.

Ducks and other fowl may be treated similarly to chickens, using the medication in amounts within the previously indicated dosage ranges.

This invention will now be described further with reference to the examples which follow.

The term "lactose-dextrin mixture" in the examples refers to a commercial mixture of 73% by weight lactose, 25% dextrin, and small amounts of flavoring, sold under the trade name "Lacto-Dextrin" by The Battle Creek Food Company, Battle Creek, Mich.

EXAMPLE 1

Fifteen chickens, all 16 weeks old and all diagnosed by a veterinarian as having leukosis were obtained. These chickens were given about 100 to 150 mg. each of vitamin $B_1$ in tablet form on the first day of test. For 38 days all of these chickens were given a diet comprising a mixture of 4 parts of commercial nutrient chicken feed which had been sifted to remove cracked corn, and 1 part of lactose-dextrin mixture. The chickens were allowed to eat this mixture at will. Three weeks later the chickens were still crippled but several were laying eggs normally. During the 38-day test period 3 of the 15 chickens died.

Of the 12 chickens which lived for the duration of the test, one had a bad wing and was given buttermilk in addition to the lactose-dextrin mixture. At the end of the 38-day test period, the veterinarian observed the chickens again and found that leukosis had been cured or arrested in 80% of the birds, and all of the chickens were laying eggs regularly.

EXAMPLE 2

A 7 months old hen was on its hocks and used its wings for balance at the start of therapy. This hen was given lactose, customarily administered in water containing 1 tablespoonful per gallon of water. A few days after the beginning of lactose therapy, the color of the hen improved and it was able to walk and run most of the time. Lactose therapy continued at the initial dosage level of 1 tablespoonful per gallon of water for the first 10 days, and was then raised to 2 tablespoonfuls of lactose per gallon of water from the 11th through the 23rd days. The hen also received 100 mg. of vitamin C on the 21st day and 200 mg. of vitamin C each on the 22 and and 23rd days. The hen was given 75 mg. of vitamin $B_1$ on the 24th day.

After discontinuance of lactose therapy from the 24th through 28th days, lactose therapy was resumed on the 29th day and continued through the 51st day. Dosage was 2 tablespoonfuls in 1 gallon of water from the 29th to the 44th days, and 3 tablespoonfuls per gallon of water thereafter. On the 52nd day the hen was on its hocks most of the time.

No medication other than occasional rations of buttermilk was given to the hen in the 31 day period from the 53rd to the 83rd days. However, the hen laid 1 egg per day from the 76th to the 83rd day, and several of these eggs were hatched. Medication was withheld for an additional period of 3 months. The hen was generally in good health during this period, although there were a few days, particularly when temperature was low, when it was hot and humid, when the chicken was on its hocks. The hen would show regression when off medication and progress when on medication. Egg production gradually declined during this period, and the decline in egg production was particularly noticeable during colder wheather. The hen was observed for an additional 3 months without medication. At the termination of detailed observation, which was approximately 9 months after the start, the hen was still in good health and no longer required thereapy, and was laying eggs regularly. Less detailed observation, with no medication, was continued for about another year during which time the hen continued to lay eggs regularly. About 10% of the chicks hatched from eggs laid by this hen while on medication developed leukosis, and about 50% of the chicks hatched while this hen was off medication developed leukosis.

EXAMPLE 3

A pullet, hatched from an egg laid by the hen of Example 2, which had leukosis, laid a normal number of eggs until it was 8 months old. At the age of 8 months, this pullet developed the leukosis complex, and was so diagnosed by a veterinarian. The chicken was placed under detailed observation on the day of diagnosis. On the 2nd through 5th days, this hen was given two 50 mg. tablets of vitamin $B_1$ per day. Medication was omitted on the 6th through the 8th days. On the 9th day the hen was given two 25 mg. tablets of vitamin $B_1$. No medication was given on the following 3 days. During these first 12 days of observation, the hen laid a total of five eggs. On the 13th day, the hen was crippled and inactive. The hen received both lactose-dextrin mixture and vitamin $B_1$ daily on the 13th through the 15th days. Vitamin $B_1$ was given in tablet form in amounts of 20, 75 and 90 mg. respectively on these three days. Lactose was given as a nutrient composition of 4 parts by weight feed and 1 part lactose, and as a water solution of 6 tablespoonfuls (about 96 grams) per gallon. This hen was given 40 mg. of vitamin $B_1$ on the 16th day, no medication on the 17th through 20th days, 30 mg. on the 21st and 22nd days, and 75 mg. on the 23rd and 24th days, and 100 mg. on the 25th day. The hen was observed by a veterinarian on the 27th day and was walking well at that time. Shortly thereafter, the hen developed a slight bend in the neck which remained for the next 10 months. However, during this time, the hen received no medication except during a few days, and continued to lay eggs and to be in general good health except for the slight bend in the neck. Before the health of the hen was restored, i.e. during the first 4 weeks of the test, the chicken would regress when taken off medication and progress when on medication.

EXAMPLE 4

A hen which was eight months old and had crippled feet and a pale comb with several white tips, indicative of leukosis, was obtained from a coop where five other chickens lay dead. This hen was given 3 to 4 tablets (75 to 100 mg.) of vitamin $B_1$ on the 1st to the 5th days of observation. On the 7th day, the hen received 2 tablets of vitamin $B_1$, and was scarcely able to stand all day. No medication was given on the 8th day, but the hen's ability to stand and its respiration were improved. The hen received 3 tablets per day on the 9th day and 10th day, and 2 tablets on the 11th and 12th days. The hen was on its hocks for most of the time these three days. No medication was given on the 13th day, and the hen was on its hocks most of the time. The hen was still on its hocks on the 14th day, but the color of the comb was improved, and 2 tablets of vitamin $B_1$ were given. Dosage of 2 tablets of vitamin $B_1$ per day was continued on the 15th through 17th days inclusive, and this dosage was raised to 3 tablets per day on the 18th and 19th days and to 4 tablets per day on the 20th and 21st days. After some improvement on the 18th day, the condition of the hen again declined, and the color of the comb was worse by the 21st day.

At this point medication on vitamin $B_1$ was discontinued and lactose therapy was substituted. Lactose was given in two forms, first, as a composition containing equal parts by weight of lactose and sifted nutrient mash, and secondly, as a slurry of lactose in water, containing 25% by weight of lactose. This medication was continued for the next 20 days (the 22nd through 42nd days of observation). The temperature, barometric pressure and humidity varied considerably during this period, the temperature ranging from about 60 to about 92° F. and the humidity from about 48 to 100%. The hen dropped its wings more often on high humidity days. On the 43rd day of observation, mash medication was omitted and lactose was given only in the form of a water slurry of 3 parts of water and 1 part of lactose. The color of the comb at this time was good. Administration of buttermilk was begun on the 41st day of observation. The hen had virtually no stiffness on the 44th through 50th days of observation. No medication was given on the 44th through 50th days, except for a slurry of lactose in water (3 parts of water per 1 part of lactose) on the 47th day. Lactose in both the nutrient mash (equal parts of nutrient feed and lactose) and in the water (3 parts of water per 1 part of lactose) were given on the 51st day. Improvement in the color of the comb occurred during the course of the day, and the hen was on its hocks but with no stiffness in the hocks when walking in the early afternoon, while five hours later the hen was off its hocks and was walking normally. For the next 10 days, lactose was discontinued and the hen received buttermilk and 3 tablespoonfuls of lactose per day. The hen walked normally and had a good comb color during this period. On the last of these ten days (the 61st day of observation) the hen's wings drooped. Its condition was better the following day, but the color of the comb deteriorated to a whitish pink. Dextrose medication was started on the 63rd day, on which day the hen was given 4 tablespoonfuls of dextrose. The comb was bright red. The dextrose dosage was then raised to 12 tablespoonfuls per day, and then again lowered to 3 tablespoonfuls per day, at which level it was maintained for 15 consecutive days. The hen walked normally during most of this time and laid eggs on most days.

Dextrose medication was withdrawn and iodine therapy was substituted on the 81st day of observation. Iodine therapy was continued for 7 days. Then no medication was given for the next 7 days. For the next month thereafter, no medication was given, and the bird continued to lay eggs on the majority of days. Then, 4 months after the initial observation, the bird was well and laying eggs.

EXAMPLE 5

A hen was observed over a period of 21 months. At the start of observation this hen was completely on its hocks, its toenails were curled and and it was unable to stand for more than 15 seconds. For the first 23 days of observation this hen was given powdered lactose in amounts ranging from 2 to 4 tablespoonsfuls (about 32 to 64 grams) per day. Dosage of 4 tablespoonfuls were given on the 1st and 2nd days of test, then medication was decreased to 3 tablespoonfuls per day on the 3rd through the 17th days of test, and was then decreased to 2 tablespoonfuls per day on the 18th through 20th days of test, then was increased to 4 tablespoonfuls per day on the 21st through 23rd days of test. During these 23 days some day to day variations in the hen's condition were noted, although generally she was unable to stand for more than very short periods of time ranging from as little as 9 seconds up to a maximum of less than 5 minutes. The hen was able to stand longer on sunny warm days than on damp days. No medication was given on the 24th day of observation. Two tablespoonfuls of lactose powder were given on the 25th day of test and the hen stood for a maximum of 1 minute and 45 seconds.

Medication was changed beginning on the 26th day to slurries of lactose in water containing usually 50% or 25% by weight of lactose, and nutrient compositions of sifted mash and lactose. The hen was allowed to drink the water containing lactose and to eat the mash containing lactose at will. The hen received lactose only in the water on the 26th and 27th days of test. From the 28th to 44th days, the hen received lactose medication in both the water and the mash. The hen continued to be on its hocks most of the time and to be able to stand for short periods not exceeding 5 minutes. However, good color was observed on the 44th day. Buttermilk was also given the hen on the 44th day. On the 45th day the hen was able to stand for unlimited periods of time, and generally continued to be able to stand for unlimited periods of time through the 54th day. From the 44th to 54th days the hen received lactose medication only in the water in the form of a mixture of 25% lactose and 75% water, and received none in the mash. Buttermilk was given to the chicken on most days between the 44th and 54th days. Some limping was observed on the 56th day, but on the 57th day and for the remainder of the test period the hen had no difficulty in standing and walking normally. Lactose medication (3 tablespoonfuls per day) was given on the 58th through 61st days. No medication was given for a period of 30 days beginning with the 62nd day. Lactose was resumed on the 93rd day and continued through the 111th day, the daily dosage ranging from 1 to 4 tablespoonfuls per day. Except on 2 days when less than 2 tablespoonfuls was given, 2 other days when 4 tablespoonfuls were given, and 1 day when 6 tablespoonfuls were given, the daily dosage was 2 tablespoonfuls per day. Medication was switched to a lactose-dextrin mixture on the 112th through 116th days, the amount being either 2 or 3 tablespoonfuls per day. This same medication was given on the 115th day. The hen then began laying eggs regularly. Medication was then discontinued, and the hen was still laying eggs regularly 6 months later.

EXAMPLE 6

A hen was observed and medicated over a period of about 9 months. This hen when first observed was down on both hocks and regurgitated when handled. Two months later the hen still regurgitated when handled and the right wing was down and the hen continued to be on its hocks. Medication was first administered on the 75th day of observation. This medication consisted of 20 mg. of vitamin $B_1$ on the 75th day, no medication was given on the 76th day, and 100, 40, 80, 125 and 80 mg. of vitamin $B_1$ were given on the 77th through 81st days respectively. No medication was given from the 82nd to 119th days. The hen's wing appeared to be lifted on the 81st day. On the 102nd day, the right wing was down again. On the 114th to 122nd days, the hen was given a diet of 4 parts of mash and 1 part of lactose-dextrin mixture mixed together. No medication was given for 1 month. At the end of this month, the chicken stood on only one leg and displayed signs of neural leukosis. The hen was given 8 tablets (10 mg. each), 4 tablets twice a day, on the 153rd to 157th days. The weather, which had been humid, became clear and less humid, and the hen's condition improved. After omitting medication on the 158th day the hen was given 14 tablets (10 mg. each) of vitamin $B_1$ but no food on the 159th day. On the 160th to 165th days, the hen was given 12 tablets of vitamin $B_1$. Following that, the hen was given twelve 25 mg. tablets of vitamin $B_1$ plus a nutrient composition containing 4 parts of sifted mash to 1 part of lactose-dextrin mixture for the 6 succeeding days. The hen was then taken off of medication for 3 months, and during this time it would stand on only one leg. For the next 7 days the hen continued to stand on only one leg, did not eat much, but did drink some water. The next day the hen was given four 25 mg. tablets of vitamin $B_1$. The following day the hen was given 200 mg. of vitamin $B_1$, and on the next day and for the next five days after that, twelve 25 mg. tablets were given. Steady improvement in the bird's condition was noticed on these 5 days. During the entire test period, the hen would improve when medication was administered and regress when it was withdrawn.

EXAMPLE 7

A hen weighing 2 lbs. 14 oz. which had crippled feet and was on its hocks was diagnosed by a veterinarian as having leukosis. This hen was given a nutrient diet of 4 parts of sifted mash and 1 part of lactose-dextrin mixture for a period of 28 days. Its condition was considerably improved at the end of this time, and most of the symptoms of leukosis originally present had disappeared. This hen was observed over a period of 9 months. No medication was given from the 28th to the 124th day after the start of the test. During these first 124 days after the start of the test the hen's condition fluctuated somewhat, but one wing was down after 124 days. On the 125th day through the 127th day the hen was given 125 mg. of vitamin $B_1$ each day. There was no further medication until the 135th day and 136th day when again 125 mg. of vitamin $B_1$ was given. On the 135th day the one wing was down but three days later the wing was normal. This hen laid eggs most of the time during the first 136 days of observation. After nearly 6 months of observation the hen was again on its hocks. On the 194th and 195th days of the test, 100 mg. of vitamin $B_1$ was given. There was no medication on the 196th day, but on the 197th day and on the 202nd day the hen was given 250 mg. of vitamin $B_1$. The dosage was raised to 300 mg. each on the next 2 days. For the next 31 days dosage was continued at high levels. Except for 3 days of these 31 days, the dosage level was 16 tablets (400 mg.) of vitamin $B_1$ per day, and on the 3 days the dosage was 12 tablets (300 mg.) of vitamin $B_1$ per day. During this time the hen laid eggs regularly and walked normally most of the time. Swelling in the left leg of the bird developed on the 208th day and the hen was taken to a veterinarian who said that the swelling looked like a calcium deposit. Dosage was then cut on the next 3 days to 14 tablets per day, and for the 5 days following that to 8 tablets per day. Administration of vitamin $B_1$ was discontinued. Five weeks after the discontinuance of vitamin $B_1$ administration, the hen was still laying eggs regularly and had no limp. The hen was again seen by a veterinarian one year after the initial examination. Swelling in the left foot was considerably less than on the 208th day. The veterinarian diagnosed the swelling as due to a calcium deposit in the foot, indicative of osteopetrosis.

EXAMPLE 8

A hen, 6 months old when first observed, was down on its left hock and had a poor right leg. This hen was given two 10 mg. tablets of vitamin $B_1$ on the first day of observation. The hen was also given a diet composition of 4 parts of sifted mash and 1 part of lactose-dextrin mixture, and water containing 6 heaping tablespoonfuls of dissolved lactose-dextrin mixture on the first 7 days. The hen was also given 70 mg. of vitamin $B_1$ on the 2nd and 3rd days. No vitamin $B_1$ was given on the 4th, 5th, 6th or 7th days. On the 8th and 9th days of the test, a lactose-dextrin mixture comprising 50% by weight of lactose-dextrin and 50% by weight of water was given. On the 10th day, a diet consisting of a composition of 4 parts by weight of sifted mash and one part of lactose-dextrin mixture was again given. On the 11th day, a composition of 6 parts by weight of mash and 1 part by weight of lactose-dextrin mixture was given as the diet, and the hen was given water containing 6 heaping tablespoonfuls of lactose-dextrin mixture per gallon, plus 20 mg. of vitamin $B_1$. The same medication was given on the 12th day except that the amount of vitamin $B_1$ was 50 mg. The administration of lactose-dextrin mixture in both feed and water was the same on the 13th and 14th days as on the 12th day, but no vitamin $B_1$ was given. On the 15th day, the hen received 30 mg. of vitamin $B_1$ plus water containing lactose-dextrin. The feed given prior to 8 P.M. that day contained no medication. At 8 P.M. the hen received a feed containing 4 parts of sifted mash and 1 part of lactose-dextrin mixture. On the 16th day the hen was given 70 mg. of vitamin $B_1$. The temperature was about 80° F., humidity about 67%, and the hen appeared to be adversely affected by the weather. The hen was weak, on its hocks, and was limping. On the 17th day the hen was given 40 mg. of vitamin $B_1$ but no other medication.

Medication on the 18th day consisted of a diet composition of 4 parts of mash to 1 part of lactose-dextrin mixture, plus 40 mg. of vitamin $B_1$. The same medication was given on the 20th day, except that the amount of vitamin $B_1$ was 75 mg. On the 21st day, the hen was given 100 mg. of vitamin $B_1$, and on the 22nd day, 40 mg. Vitamin $B_1$ dosages on the 23rd and 24th days were 50 and 75 mg., respectively. No medication was given for the next 3 days. The hen received 50 mg. of vitamin $B_1$ on the 28th day, but no medication on the 29th or 30th days. Medication on the 31st day consisted of 80 mg. of vitamin $B_1$, and on the 32nd through 34th days, 100 mg. per day. No medication was given on the 37th through 41st days inclusive. The condition of the chicken regressed between the 37th and 41st days. After 41 days the hen was on its hocks, but had shown occasional improvement during the intervening period. For the next 5 months the hen was continually on one leg, and except for a brief period approximately 3 months after the beginning of observations when a lactose-dextrin mixture was administered, this hen received no medication. The hen was still alive, laying regularly, and generally in good health, except for the crippling in one leg, 7 months after the initial observations.

EXAMPLE 9

A hen weighed 3 lbs. 4 oz. on the first day of observation, was diagnosed by a veterinarian as having leukosis and its right wing was down. For the next 3½ weeks, the hen was given a nutrient diet of 4 parts of sifted mash and 1 part of lactose-dextrin mixture with buttermilk added occasionally. The hen could lift the wing only when buttermilk was added. The hen was observed again by the veterinarian 4 weeks after the initial observation and was much improved. After nearly 5 months, the hen started setting and was put on a diet consisting of a composition of 4 parts by weight of mash and 1 part by weight of lactose-dextrin mixture for 8 consecutive days. The hen continued setting during these 8 days. On the following day, the hen was given eight 10 mg. tablets of vitamin $B_1$. This medication was continued for the next 8 days. During this time the hen was setting on the nest most of the time. There was no medication for about a week, then the hen was given 4 tablets of vitamin $B_1$ on 1 day, then medication was discontinued for 6 more days, then the hen was given 8 tablets of vitamin $B_1$ per day on 2 consecutive days. For the next 7 days, the hen was given 10 tablets of vitamin $B_1$ per day. During these last 9 days, the hen was off its nest and was laying eggs. Further medication was then discontinued but the hen's health was still good one year after initial observation.

EXAMPLE 10

A duck was placed in a pen which also had a chicken hen afflicted with leukosis. The duck remained in this pen for five months, at which time it was observed to be on its hocks, indicative of leukosis. The duck was immediately given two 25 mg. tablets of vitamin $B_1$ each day. The duck got well and continued to remain in good health and to lay eggs thereafter.

EXAMPLE 11

Acute toxicity tests on chickens which are given vitamin $B_1$ were carried out as follows:

Three hens, all about 9 months old and designated A, B and C, were given vitamin $B_1$ in the amounts indicated in Table I below:

TABLE I

| Day: | Dosage | | |
| --- | --- | --- | --- |
| | A | B | C |
| 1 | 1,000 mg | | |
| 2 | 2,500 mg | 2,000 mg | 1,800 mg |
| 3 | 2,200 mg | 2,500 mg | 2,500 mg |

The three hens were observed on the fourth day and none showed any ill effects.

EXAMPLE 12

Observation of the hens of Examples 2 and 7 was continued, without medication, atfer symptoms of leukosis had disappeared until they reached the age of about 18 months. Both of these hens molted at the age of about 17 months and molting lasted for about 1 month. Egg production continued at a high rate (averaging approximately 4 eggs every 5 days) until molting.

EXAMPLE 13

The hen described in Example 7 set on her nest on the 428th and 429th days. Administration of vitamin $B_1$ was then resumed according to the following schedule:

| Day: | Vitamin $B_1$ dosage |
| --- | --- |
| 429 | mg 120 |
| 430 | mg 120 |
| 431–434 | mg. per day 200 |
| 435–439 | do 300 |
| 440 | None |
| 441–444 | mg. per day 300 |
| 445–446 | do 100 |
| 447 | mg 50 |

The hen was laying on the 448th through 457th days, and no medication was given during this period.

EXAMPLE 14

A hen was observed to be standing still most of the time with poor appetite. This hen was given 100 mg. per day of vitamin $B_1$ for 4 successive days, followed by 50 mg. of vitamin $B_1$ per day on the next 2 days. This hen was given sifted mash starting on the 4th day. Administration of vitamin $B_1$ restored the hen to normal health, which was still continuing 2 months after vitamin $B_1$ was withdrawn.

EXAMPLE 15

A chicken having poor appetite and observed to be standing still was given a sifted diet of 100 mg. per day of vitamin $B_1$ for 2 successive days, followed by 50 mg. of vitamin $B_1$ for 9 additional successive days. After that, the chicken was restored to normal health and vitamin $B_1$ therapy was withdrawn. Two months later, the health of the chicken was still normal.

EXAMPLE 16

A 23 months old chicken which had previously been well was found upside down on his back, and his toes had become crippled and his right leg had started to swell. This chicken was given 25 100 mg. tablets of vitamin $B_1$ for 4 successive days, followed by 50 100 mg. tablets of vitamin $B_1$ on the 5th day. The next day the chicken was walking around, and continued to be in good health after that.

EXAMPLE 17

A hen, aged 22 months, was observed to be standing still much of the time and moving slowly. This hen was fed on a chicken feed diet in pellet form and was given 6 tablespoonfuls of lactose in 3 quarts of water each day for 5 days following initial observation. Medication was then switched to vitamin $B_1$. For the next 2 days, the hen was given 100 mg. of vitamin $B_1$ per day. The hen became more active and appetite improved. Dosage of vitamin $B_1$ was then raised to 200 mg. per day for the 12 following days. During this time the hen became more active. For the next 3 days the hen was given 100 mg. of vitamin $B_1$. On the last day the diet was switched from the pellet diet to a diet of sifted mash. The hen's activity improved but droppings became watery, and vitamin $B_1$ medication was reduced to 5 mg. per day for the next 15 days. Meanwhile the sifted feed diet was continued. After these 15 days all medication was withdrawn and the diet of sifted feed continued. The hen was in good health. Eight days after discontinuance of vitamin $B_1$ the hen was returned to a pellet diet without medication. The health of the hen continued to be good.

EXAMPLE 18

A chicken which was standing still and which had poor color indicating leukosis when first observed was given 100 mg. of vitamin $B_1$ per day for 6 days. During this time some improvement in appetite and activity was noted. This chicken was initially on a diet of feed in pellet form but was switched to a sifted laying mash diet on the 6th day. When the droppings became thin, medication was reduced to 50 mg. of vitamin $B_1$ on the 7th and 8th days. The droppings became harder, but the chicken limped slightly on damp days, and 50 mg. per day of vitamin $B_1$ was continued on the 9th through 17th days. The feed was switched from sifted laying mash to feed pellets on the 13th day. By the 17th day the chicken was eating well and was laying. Medication was then withdrawn, and the hen was fed a normal chicken feed diet in pellet form supplemented with cracked corn. The hen's condition was normal and she was laying eggs.

I claim:
1. The method of treating fowl having leukosis which comprises orally administering a therapeutic agent to the afflicted fowl consisting essentially of at least one member of the group consisting of:
  (a) about 8.6 to 32.5 grams per day of a mixture consisting essentially of lactose and dextrin, the weight ratio in said mixture being in the range of between about substantially all lactose to about 2.25 parts of dextrin to 1 part of lactose;
  (b) about 10–60 grams per day of lactose; and
  (c) at least 50 mg. per day of vitamin $B_1$.
2. The method of claim 1 wherein the fowl being treated is chicken.
3. The method of claim 2 wherein said member is administered in a diet including a nutrient feed.
4. The method of claim 2 wherein said chicken is at least 20 weeks in age and said member is about 10 to 60 grams per day of lactose.
5. The method of claim 2 wherein said chicken is at least 20 weeks in age and said member at least 50 mg. per day of vitamin $B_1$.

6. The method of claim 5 wherein said member is at least 100 mg. per day of vitamin $B_1$.
7. The method of claim 2 wherein said chicken is about 8 to 20 weeks in age and wherein the administered composition contains about 3 to 6 parts by weight of nutrient feed and 1 part by weight of a composition consisting essentially of lactose and dextrin, the weight ratio in said composition being in the range of between about substantially all lactose to about 2.25 parts of dextrin to 1 part of lactose.
8. A composition of matter useful in the treatment of leukosis in chickens comprising about 3 to 6 parts by weight of a nutrient feed and 1 part by weight of a mixture consisting essentially of lactose and dextrin, the weight ratio in said mixture being in the range of between about substantially all lactose to about 2.25 parts of dextrin to 1 part of lactose.
9. The method of claim 1 wherein said lactose and dextrin are present in weight proportion of about 3 parts of lactose for about each part of dextrin.
10. A composition of matter useful in the treatment of leukosis in chickens comprising a feed material and a therapeutic agent which consists essentially of at least one member of the group consisting of:
  (a) about 8.6 to 32.5 grams of a mixture consisting essentially of lactose and dextrin, the weight ratio in said mixture being in the range of between about substantially all lactose to about 2.5 parts of dextrin to 1 part of lactose; and,
  (b) at least 50 mg. of vitamin $B_1$;
wherein the proportion of said feed material is about the usual daily requirement.

References Cited

Chem. Abst., 44, 10960H (1950).
Chem. Abst., 45, 9720E (1961).

ALBERT T. MEYERS, Primary Examiner
S. J. FRIEDMAN, Assistant Examiner

U.S. Cl. X.R.
424—255